United States Patent
Yoshizako et al.

(10) Patent No.: US 8,602,205 B2
(45) Date of Patent: Dec. 10, 2013

(54) BELT CLEANER

(75) Inventors: Kageyoshi Yoshizako, Sakai (JP);
Nobuyoshi Fujisaki, Osaka (JP);
Atsushi Ohse, Osaka (JP)

(73) Assignee: Nippon Tsusho Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/462,327

(22) Filed: May 2, 2012

(65) Prior Publication Data

US 2012/0305366 A1   Dec. 6, 2012

(30) Foreign Application Priority Data

Jun. 2, 2011   (JP) .................................. 2011-123998

(51) Int. Cl.
*B65G 45/16*   (2006.01)

(52) U.S. Cl.
USPC .......................................... 198/499; 198/497

(58) Field of Classification Search
USPC .......................................... 198/499, 497, 498
See application file for complete search history.

(56) References Cited

U.S. PATENT DOCUMENTS

| | | | | |
|---|---|---|---|---|
| 3,841,470 A | * | 10/1974 | Meguro | 198/499 |
| 4,825,996 A | * | 5/1989 | Davidts | 198/497 |
| 5,692,595 A | * | 12/1997 | Gilbert | 198/499 |
| 6,082,524 A | * | 7/2000 | Brink | 198/499 |
| 6,575,292 B2 | * | 6/2003 | Swinderman | 198/499 |
| 6,926,133 B2 | * | 8/2005 | Kolodziej et al. | 198/498 |
| 6,978,881 B2 | * | 12/2005 | Brink | 198/499 |
| 7,007,794 B2 | * | 3/2006 | Waters et al. | 198/497 |
| 7,051,862 B1 | * | 5/2006 | Smith et al. | 198/499 |
| 7,093,706 B2 | * | 8/2006 | DeVries et al. | 198/499 |
| 7,383,940 B1 | * | 6/2008 | Stumpf et al. | 198/499 |
| 8,393,459 B2 | * | 3/2013 | Childs et al. | 198/497 |

FOREIGN PATENT DOCUMENTS

| | | |
|---|---|---|
| JP | 8-208020 A | 8/1996 |
| JP | 10-265029 A | 10/1998 |
| JP | 2002-46851 A | 2/2002 |

OTHER PUBLICATIONS

Japanese Patent Office Action and English translation dated Dec. 25, 2012 of Japanese patent application No. 2011-123998.

* cited by examiner

*Primary Examiner* — Gene Crawford
*Assistant Examiner* — Keith R Campbell
(74) *Attorney, Agent, or Firm* — Roberts Mlotkowski Safran & Cole, P.C.; David S. Safran (57) ABSTRACT

A belt cleaner includes one or more cleaner unit (6) which has a support plate (8) providing a scraping portion (7), an upper resilient block (9), and a lower resilient block (10), wherein said support plate (8) is supported by said upper resilient block (9) to be held in a forward leaning posture to make the scraping portion oppose to the belt running direction (X) so that the support plate (8) may be shifted to an upright posture by deformation of the upper resilient block (9), and wherein said lower resilient block (10) may deform resiliently to move said upper resilient block (9) including the scraping portion (7) upon application of pushing forces, such as bumping shocks or the like thereto so that shocks may be absorbed.

12 Claims, 5 Drawing Sheets

BELT CLEANER

FIELD OF THE INVENTION

The present invention relates to a belt cleaner for removing leavings of conveying material stuck on a surface of a conveyor belt.

BACKGROUND OF THE INVENTION

Conventionally, a belt cleaner provides one or more cleaner units mounted on a frame extending in a transverse direction of a conveyor belt. Each cleaner unit provides a scraping portion which contacts with the belt surface and scrapes off leavings stuck thereon. The cleaner unit comprises a support plate which provides said scraping portion and a resilient block which supports resiliently a lower portion of said support plate. The resilient block is formed of rubber and adhered to the support plate.

Prior art cleaners for a conveyor belt are disclosed in the following documents.
Patent document 1: JP 2829498 B
Patent document 2: JP 3893510 B
Patent document 3: U.S. Pat. No. 3,841,470 B

SUMMARY OF THE INVENTION

Problems to be Solved by the Invention

In the conventional belt cleaner, the scraping portion of the support plate is contacted with the belt surface by raising and rotating the frame. In this state, the resilient block is deformed moderately to push up the support plate. As a result, the scraping portion is contacted with the belt surface with a predetermined pressure and scrapes off the leavings stuck when the belt runs.

While the conveyor belt is running, the scraping portion of the support plate follows the belt surface by deforming the resilient block. When the scraping portion receives shockwaves from the belt surface for example, the scraping portion may retreats together with the support plate by deforming the resilient block so that the shocks may be absorbed. As a result, the scraping portion is kept in contact with the belt surface with a moderate pressure, and scrapes off the leavings thereon without damaging the belt surface.

During the scraping operation, the scraping portion, which contacts with the belt surface, is pushed to move towards the belt running direction, and the resilient block is deformed. The scraping portion keeps contacting with the belt surface to scrape off the leavings as far as balance is maintained between a pushing force in the belt running direction applied by the belt and a restoring force opposing said pushing force generated by the deformed resilient block.

When installing the belt cleaner in the conveyor belt, the scraping portion is made to contact with the belt surface by raising and rotating the frame until the support plate takes an upright posture intersecting the belt surface, while the conveyer belt is stopped. When the conveyor belt starts running, the scraping portion is pushed to move in the belt running direction until the balance as mentioned above is caused.

In the conventional art, however, such work is required, when installing the belt cleaner, as that the resilient block is deformed until the scraping portion becomes pushed to the belt surface with a predetermined pressure. If the contact pressure is insufficient, the leavings stuck on the belt surface cannot be scraped off in good order.

During the scraping operation, due to a pushing force applied to the scraping portion, the support plate shifts its posture from said upright posture to a backward leaning posture by tilting thereof towards the belt running direction. When the support plate shifts its posture from the upright posture to the backward leaning posture, a top portion thereof moves along a downward arc way, and the scraping portion moves in a direction of getting away from the belt surface. For this reason, there is such a problem that the effect of scraping off the leavings on the belt surface will deteriorate in accordance with the downward movement of the scraping portion.

According to the discovery of the inventors, the problems mentioned above may be solved by a belt cleaner in which a support plate is arranged to take a forward leaning posture which opposes a belt running direction at the time when the belt cleaner has been installed in the conveyor belt. The belt cleaner is so constituted that the support plate shifts its posture from the forward leaning posture to an upright posture upon movement of a scraping portion so that the top portion of the support plate moves along an upward arc way. Under such constitution, it is not necessary to perform a complicated work which needs adjustment of the contact pressure of the scraping portion to the belt surface, and the installation of the belt cleaner becomes easy. During the scraping operation, the scraping effect will be improved since the scraping portion moves forward towards the belt surface.

In the conventional belt cleaner, the resilient block is formed of rubber with high modulus of rebound resilience. The resilient block cannot absorb any pulsing vibrations which may cause at the scraping portion when scraping the leavings. The support plate vibrates violently and the scraping portion cannot contact stably with the belt surface. Since the scraping portion may bite the belt surface due to said high rebound resilience of the resilient block, there is a problem of damaging the belt surface.

The above mentioned problems might be solved by providing the resilient block formed of rubber with low modulus of rebound resilience. However, in this case, the resilient block cannot rebound suitably in response to shockwaves given by the belt surface, it becomes difficult to make the scraping portion follow the running belt surface. As a result, there is a problem that the effect of scraping off the leavings on the belt surface will deteriorate.

Means for Solving the Problems

The present invention provides a belt cleaner, which has solved the above problems, including one or more cleaner units mounted on a frame extending in a transverse direction of a conveyor belt, whereby leavings stuck on a belt surface are scraped off by a scraping portion provided at a top portion of said cleaner unit. Said cleaner unit comprises a support plate providing said scraping portion, an upper resilient block supporting resiliently a lower portion of said support plate, and a lower resilient block supporting resiliently a bottom of said upper resilient block. Said support plate is supported by said upper resilient block in such manner that said support plate is held in a forward leaning posture along a tilted plane inclining towards a front direction of the cleaner unit which opposes against a belt running direction with respect to a vertical line perpendicular to the belt surface. Said upper resilient block includes hypothetical pivot axis and is constituted to be deformed resiliently when a pushing force in said belt running direction is applied to said scraping portion so that said support plate shifts its posture to an upright posture from said forward leaning posture about said hypothetical pivot axis to lift up said scraping portion. And said lower resilient block is constituted to be deformed when a further pushing force in said belt running direction and/or in a downward direction is applied to said upper resilient block which is compressed or deformed by said support plate shifted to said upright posture so that said lower resilient block allows said upper resilient block to move downward in response to said further pushing force.

In an embodiment of the present invention, modulus of rebound resilience (R1) of said upper resilient block and modulus of rebound resilient (R2) of said lower resilient block are selected under condition of R1<R2, thereby vibrations caused in said support plate contacting with the belt surface may be absorbed by said upper resilient block having said lower modulus of rebound resilience.

In another embodiment of the present invention, a rigid plate is provided between said upper resilient block and said lower resilient block, and said rigid plate is arranged along a slope plane rising towards a back direction of the cleaner unit which follows said belt running direction.

In further another embodiment of the present invention, said lower resilient block is provided with a concave on a back side thereof to form an upper jaw and a lower jaw so that said upper jaw may move towards said lower jaw by resilient deformation of the lower resilient block. In various preferred embodiments, the thickness of said upper resilient block with respect to the belt running direction is gradually reduced upward. Said upper resilient block includes a resilient section in front side and a resilient section in back side at both sides of said support plate respectively, and a thickness (T1) of said front section and a thickness of said back section are formed in condition of T1<T2. Said upper resilient block may be formed of butyl rubber and said lower resilient block may be formed of natural rubber so that said condition of R1<R2 may be fulfilled.

Effect of the Invention

According to the present invention, an installation of the belt cleaner 5 including the cleaner units 6 in the halted conveyor belt 2 becomes easy, and it is not necessary to perform a complicated work for adjusting a contact pressure of the scraping portion 7 to the belt surface. When the conveyor belt 2 starts running, the support plate 8, which took a forward leaning posture when installed, shifts its posture from the original forward leaning posture to an upright posture upon pushing movement of the scraping portion 7 so that the scraping portion 7 is lifted up together with the support plate 8 by tilting thereof along an arc way about hypothetical pivot axis 21 which may be formed in the upper resilient block 9 upon deformation thereof by said shifted support plate 8. As a result, the scraping portion 7 is pushed to contact with the belt surface with a suitable pressure, and the operation of scraping off the leavings becomes effective.

If the scraping portion 7 receives a further pushing force such as bumping force in the belt running direction (X) and/or in a downward direction which may be caused due to bumping of hard material contained in the leavings to the scraping portion 7, the lower resilient block 10 supporting the bottom of the upper resilient block 9 may be deformed.

Thereby, the scraping portion 7 retreats to let the bumping force to be loosened, and absorbs or lessens the shocks. Immediately after such retreat, the scraping portion 7 is made to return its original position momentarily, and follows the running belt surface without damaging the belt, and the operation of scraping off the leavings may be carried out in an excellent manner.

According to an embodiment of the present invention, modulus of rebound resilience (R1) of the upper resilient block 9 and modulus of rebound resilience (R2) of the lower resilient block 10 are selected under condition of R1<R2. The upper resilient block 9 having lower modulus of rebound resilience (R1) can absorb such vibrations of the support plate 8 that may cause by receiving pulsing vibrations generated at the scraping portion 7 during the scraping operation. As a result, generation of vibrations at the support plate 8 may be prevented, and it becomes possible to push the scraping portion 7 to contact with the belt surface 2 in a stable condition. As mentioned above, the lower resilient block 10 having high modulus of rebound resilience makes it possible that the scraping portion 7 returns momentarily to its original position after retreating, and the scraping portion 7 always follow the running belt surface to enable a suitable operation of scraping off the leavings.

According to another embodiment of the present invention, a rigid plate 15 is provided between the upper resilient block 9 and the lower resilient block 10. The blocks 9 and 10 perform each own role of operations as mentioned above. Since the rigid plate 15 is arranged along a slope plane (HP) rising towards a back direction (B), it makes easy to form the hypothetical pivot axis 21 in the upper resilient block 9 which enables an arc motion of the support plate 8 for lifting up the scraping portion 8.

According to further another embodiment of the present invention, the lower resilient block 10 is provided with a concave 18 in addition to its resiliency. The lower resilient block 10 has high rebound resilience and enables an upper jaw 19 together with the rigid plate 15 to move forward and backward towards a lower jaw 20. Accordingly, the scraping portion 7 is enabled to retreat suitably and return momentarily to its original position after the retreat.

BRIEF DESCRIPTION OF THE DRAWINGS

FIG. 5 (A) and FIG. 5 (B) illustrate operations of an embodiment of the cleaner unit according to the present invention, FIG. 5 (A) shows a sectional view which illustrates an operation of the upper resilient block, and FIG. 5 (B) shows a sectional view which illustrates an operation of the lower resilient block.

DESCRIPTION OF PREFERRED
EMBODIMENTS OF THE INVENTION

Preferred embodiments of the present invention will be described in detail in conjunction with the accompanying drawings.

Figure 1:
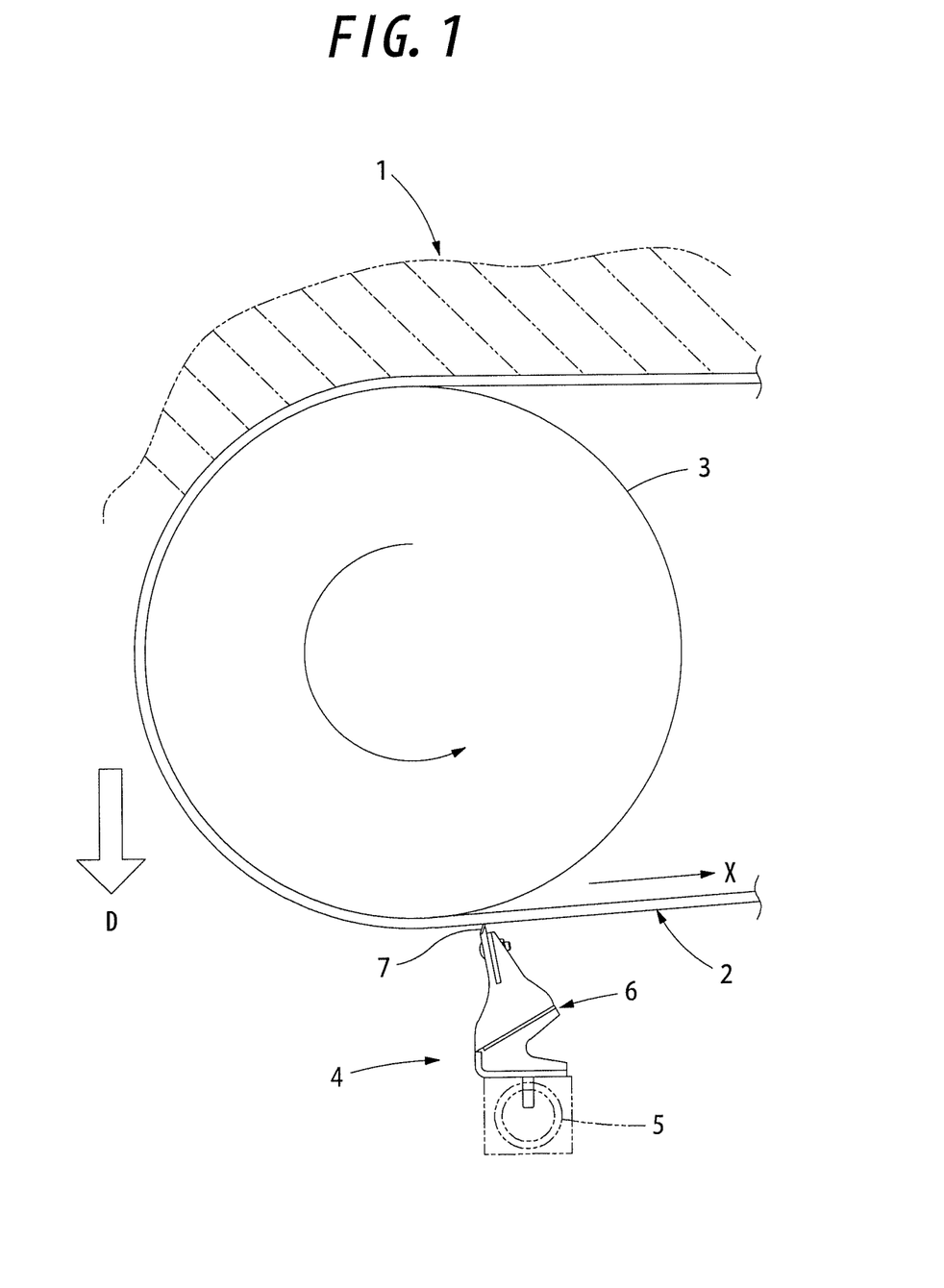
FIG. 1 shows a side view of a belt cleaner according to the present invention where the belt cleaner is installed in a conveyor belt.

FIG. 1 shows a turned around portion of a conveyor belt 2 which runs for conveying such material 1 as cokes or the like. The belt 2 comprises an endless belt which is wound circularly between a pulley (not shown) positioned at a departure side and a pulley 3 positioned at an arrival side. Accordingly, the belt 2 is turned around on said pulley 3 from its forward running side to its return running side, where the conveying material 1 is dropped down as shown by an arrow (D).

Having dropped the conveying material 1, the belt 2 runs in the return running side as shown by an arrow (X). At the return running side, leavings of the conveying material stuck on the belt surface are scraped off by a belt cleaner 4.

Figure 2:
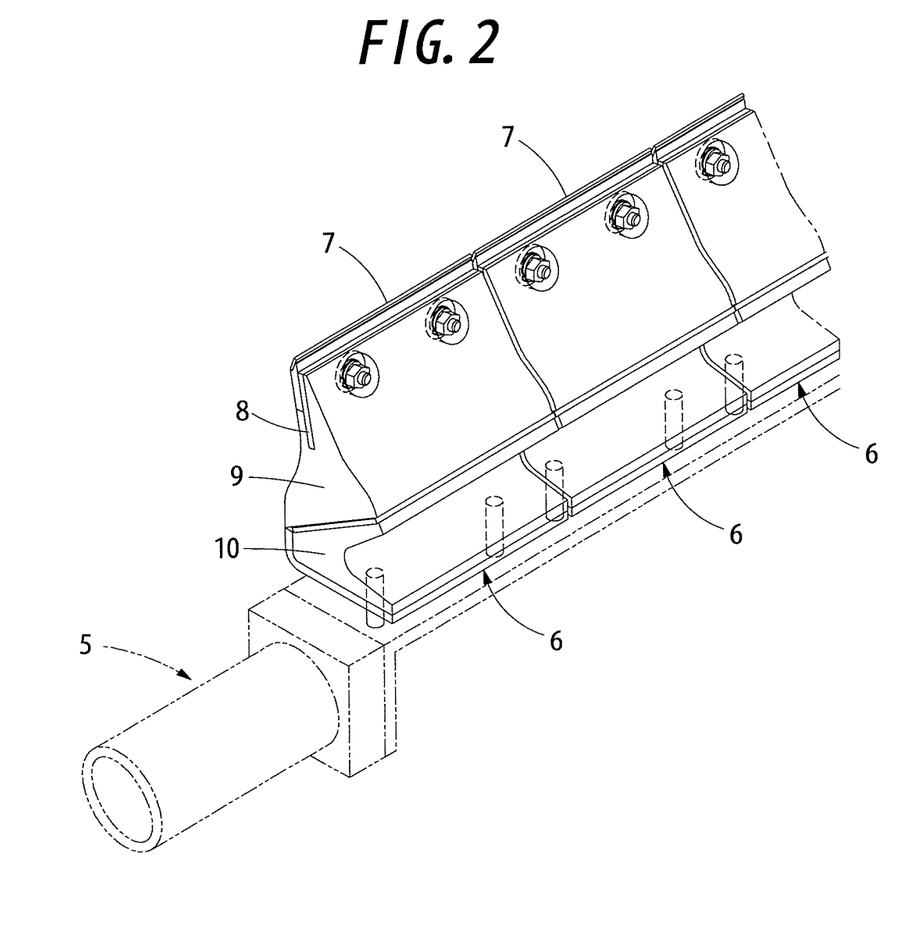
FIG. 2 shows a perspective view of an embodiment of the belt cleaner according to the present invention.

As shown in FIGS. 1 and 2, the belt cleaner 4 includes a frame 5 of a steel pipe or the like arranged to extend in a transverse direction of the belt 2, and one or more cleaner units 6 mounted on the frame. Each cleaner unit 6 provides its top portion with a scraping portion 7 which contacts with a surface of the belt 2 and scrape off the leavings stuck on the belt surface.

The plural cleaner units 6 are mounted on the frame 5 so that the scraping portions 7 thereof are aligned in a straight line intersecting the belt 2. Although it is not illustrated, the both end portions of the frame 5 are supported by support devices respectively. The scraping portions 7 are contacted with the belt surface by raising the frame 7 with the support devices.

Figure 3:
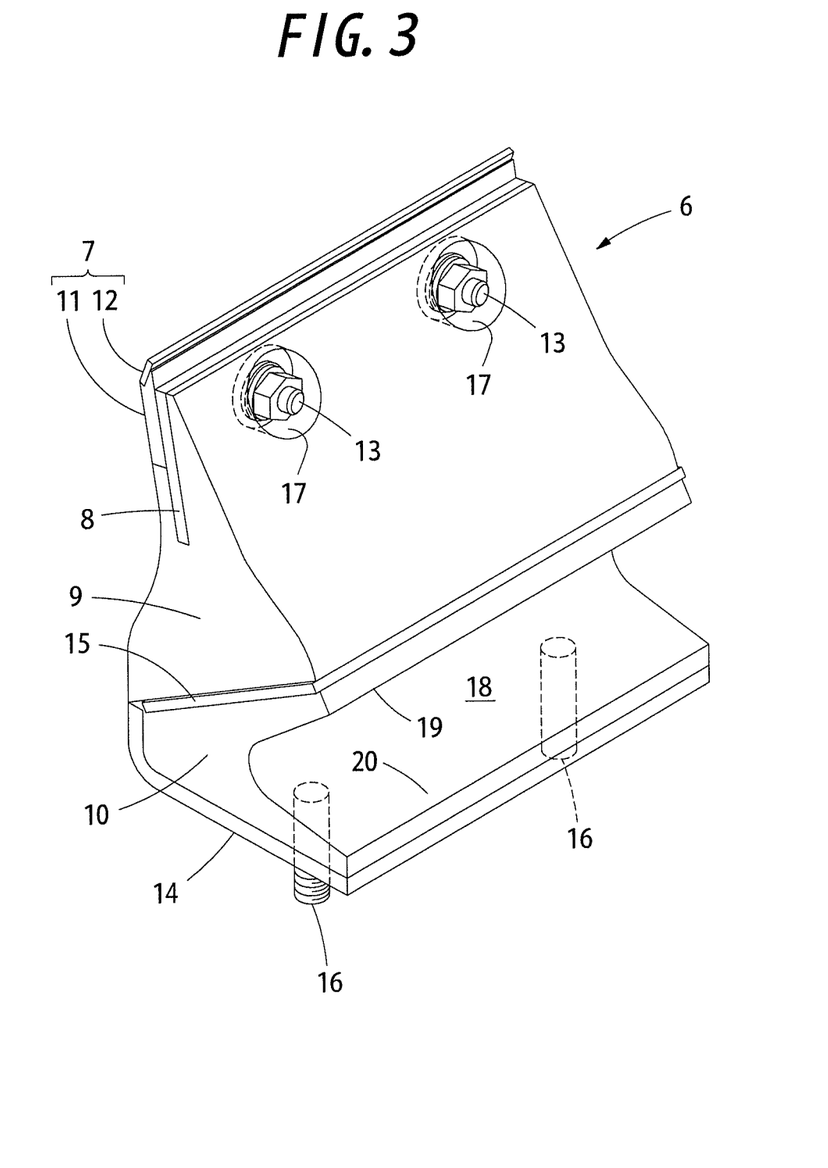
FIG. 3 shows a perspective view of an embodiment of the cleaner unit according to the present invention.
Figure 4:
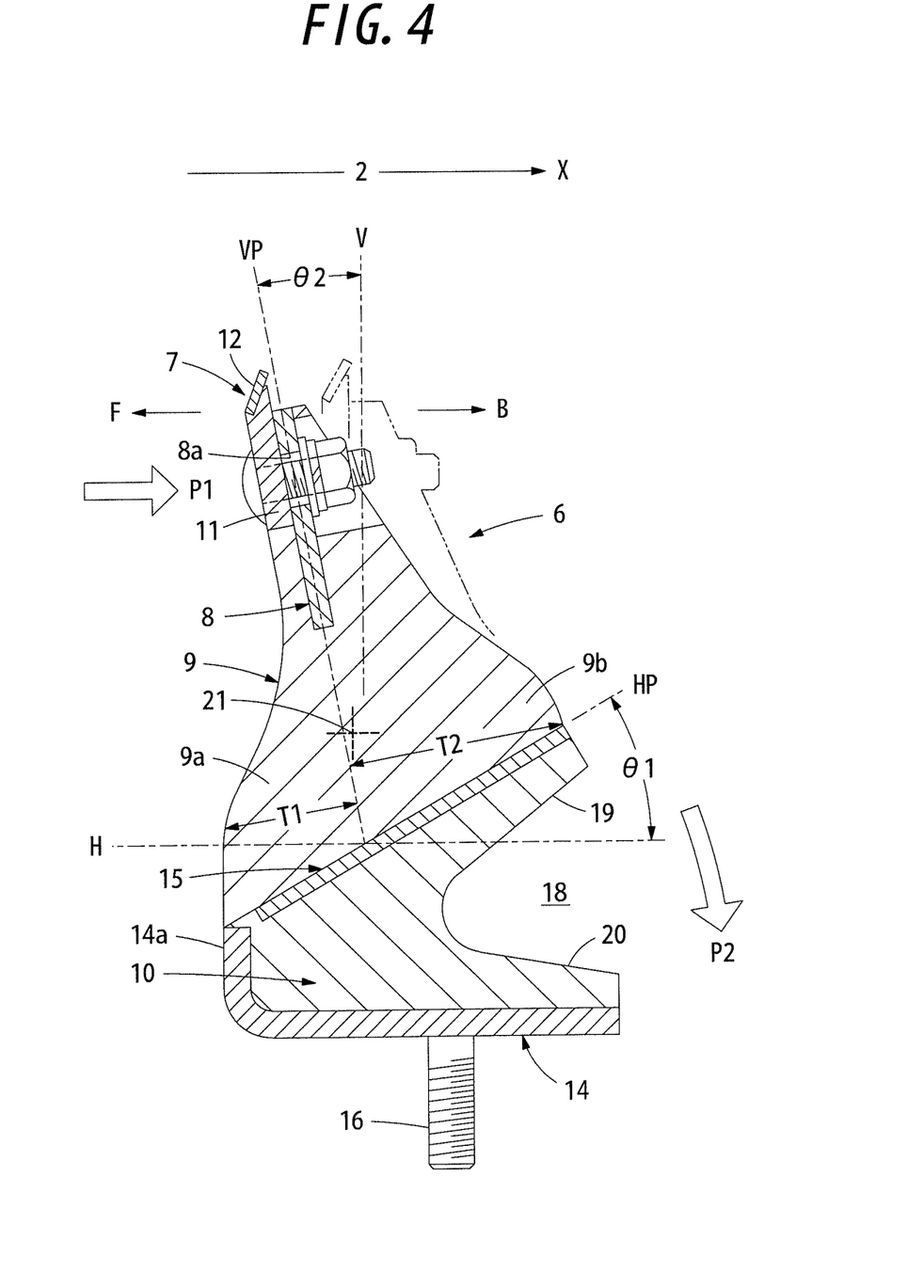
FIG. 4 shows a sectional view of an embodiment of the cleaner unit according to the present invention.

As shown in FIGS. 3 and 4, the cleaner unit 6 comprises a support plate 8 of a steel plate or the like which provides the scraping portion 7, an upper resilient block 9 which supports resiliently a lower portion of the support plate 8, and a lower resilient block 10 which supports resiliently a bottom of the upper resilient block 9. Concerning to the cleaner unit 6, a side or direction opposing the belt running direction (X) is defined as a front side or direction (F), and the opposite side or direction is defined as a back side or direction (B).

The scraping portion 7 comprises a retainer plate 11 of a steel plate or the like which extends over full width of the cleaner unit 6, and a chip 12 of hard metal such as tungsten carbide or the like which is secured via brazing or the like to the upper edge of the retainer plate 11. The retainer plate 11 is laid on the support plate 8 at the front side (F), and fixedly attached detachably thereto by fixing means 13, such as bolts and nuts, through holes 8a in the support plate 8. The hole 8a forms a vertical prolonged hole so that the fixing position of the retainer plate 11 may be vertically adjustable.

The upper resilient block 9 and the lower resilient block 10 are formed by vulcanizing rubber materials respectively. A seat plate 14 of steel plate or the like is adhered to the bottom of the lower resilient block 10. A rigid plate 15 of steel plate or the like is provided between the upper resilient block 9 and the lower resilient block 10. The seat plate 14 which provides implanting bolts 16 is mounted horizontally on the frame 5.

The upper resilient block 9 and the lower resilient block 10 are formed respectively of different rubber materials having mutually different moduli of rebound resilience. The rubber material forming the upper resilient block 9 is selected from rubber having lower modulus of rebound resilience (R1), for example, from butyl rubber. The rubber material forming the lower resilient block 10 is selected from rubber having higher modulus of rebound resilience (R2), for example, from natural rubber. Accordingly, the modulus of rebound resilience (R1) of the upper resilient block 9 and the modulus of rebound resilience (R2) of the lower resilient block 10 are constituted under condition of R1<R2. Besides the combination of butyl rubber and natural rubber, it is possible to make such condition of R1<R2 by any combinations of various rubber materials.

The cleaner unit 6 is manufactured by inserting two kinds of rubber materials as mentioned above in metallic molds with the support plate 8, the seat plate 14 and the rigid plate 15, and carrying out vulcanization of the rubber materials.

The support plate 8 is held and substantially embedded in the upper resilient block 9 simultaneously with molding process thereof. Upon molding, the upper resilient block 9 is formed with pockets 17 for inserting nuts of the fixing means 13 which communicate with the holes 8a in the support plate 8. After the vulcanization of rubber materials as mentioned above, the retainer plate 11 of the scraping portion 7 is fixed to the support plate 8 by fixing means 13 so that the chip 12 projects above the support plate 8.

As shown in FIG. 4, the seat plate 14 provides a holding wall 14a by bending upward an end portion thereof at the front side (F). The seat plate 14 is secured to the bottom of the lower resilient block 10 simultaneously with molding process so that the front side (F) of the lower resilient block 10 is held by the holding wall 14a. As a result, firm unified combination of the lower resilient block 10 and the seat plate 14 is obtained.

As shown in FIG. 4, the rigid plate 15 is arranged along a slope plane (HP), as shown by an angle (θ1), which rises towards the back direction (B) with respect to a horizontal plane (H) substantially parallel to the running direction (X) of the belt 2. The rigid plate 15 is sandwiched between the upper resilient block 9 and the lower resilient block 9 and embedded therein to be unified simultaneously with molding process thereof.

The upper resilient block 9 is formed so that the thickness thereof (thickness between the front side (F) and the back side (B)) may be gradually reduced upward from its bottom portion on the rigid plate 15. The support plate 8 is arranged along a tilted plane (VP) which is inclined to lean to the front direction (F), as shown by an angle (θ2), with respect to a vertical line (V) which intersects perpendicularly with the surface of belt 2.

Between the seat plate 14 and the rigid plate 15, the lower resilient block 10 is formed with a V-shaped concave 18 on the back side (B) thereof so that an upper jaw 19 and a lower jaw 20 are provided.

When installing the belt cleaner 4 in the conveyor belt 2 while it is stopped running, the scraping portions 7 are contacted with the surface of belt 2 by raising the frame 7 with the support devices provided at the both ends thereof.

In the state of installation of the belt cleaner 4 where the belt 2 is stopped, the support plate 8 of the cleaner unit 6 is held in a forward leaning posture along the tilted plane (VP) as shown in FIG. 4. When the belt 2 starts running, the scraping portion 7 is pushed towards the running direction (X) of the belt as shown by the chained lines in FIG. 4. The support plate 8 shifts its posture to an upright posture along the vertical line (V) by deforming the upper resilient block 9. The scraping portion 7 keeps its upright posture and scrapes off the leavings on the belt surface under the conditions that balance is maintained between a pushing force in the belt running direction (X) applied by the belt 2 and a restoring force opposing said pushing force generated by the deformed upper resilient block 9.

As shown in FIG. 4, the upper resilient block 9 is deformed so as to shift the support plate 8 from the forward leaning posture to the upright posture, when a pushing force (P1) towards the running direction (X) of the belt 2 is given to the front side (F) of the support plate 8. Upon such resilient deformation, hypothetical pivot axis 21 may be formed in the upper resilient block 9 about which the support plate 8 may be tilted along an arc way for lifting up the upper end thereof. Since the hypothetical pivot axis 21 is generated when the upper resilient block 9 is deformed as a whole, it is not specified as one pivotal axis but may be formed of composite of two or more pivotal axes. As a result, the chip 12 of the scraping portion 7 moves along an upward arc way. Accordingly, the chip 12 moves upward towards the belt surface upon its movement towards the belt running direction (X).

In the illustrated embodiment, the upper resilient block 9 includes two resilient sections at both sides of an extended plane of the support plate 8 along the tilted plane (VP), and a thickness (T1) of the resilient section 9a in front side (F) and a thickness (T2) of the resilient section 9b in back side (B) are formed in condition of T1<T2. The bottom of the upper resilient block 9 is supported by the rigid plate 15 along the slope plane (HP). For this reason, the upper resilient block 9 is deformed upon receipt of the pushing force (P1) towards the belt running direction (X) in such manner that resilient extension of the section 9a in front side (F) is greater than resilient compression of the section 9b in back side (B). As a result, the hypothetical pivot axis 21 may be produced upon deformation which makes the support plate 8 move in an arc way to raise the upper end thereof.

On the other hand, when a further pushing force (P2) in the belt running direction and/or in the downward direction is applied to the upper resilient block 9 which is being deformed and compressed by shifting movement of the support plate 8 to the upright posture, the lower resilient block 10 may be deformed to move the upper resilient block 9 to follow the further pushing force (P2). Specifically, the lower resilient block 10 doses not only deform itself but also make the upper jaw 19 together with the rigid plate 15 move forward and backward towards the lower jaw 20.

Figure 5A:
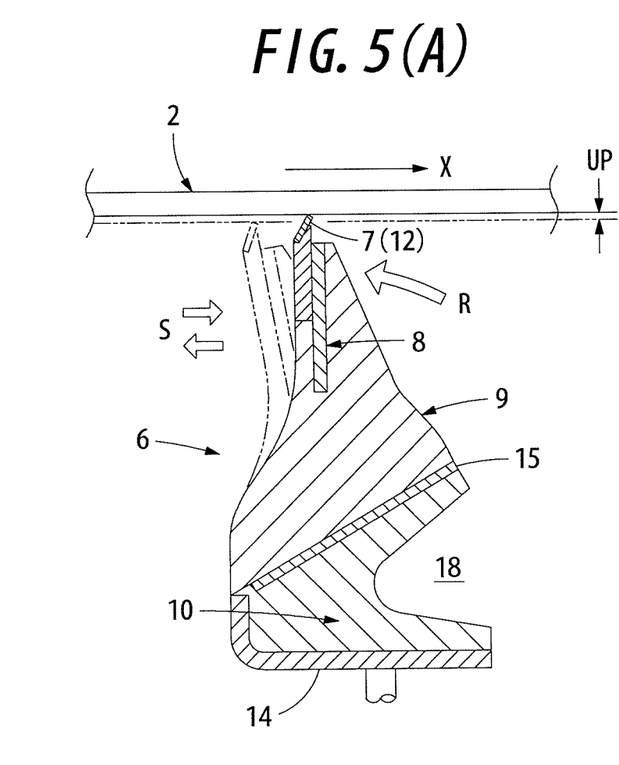
Figure 5B:
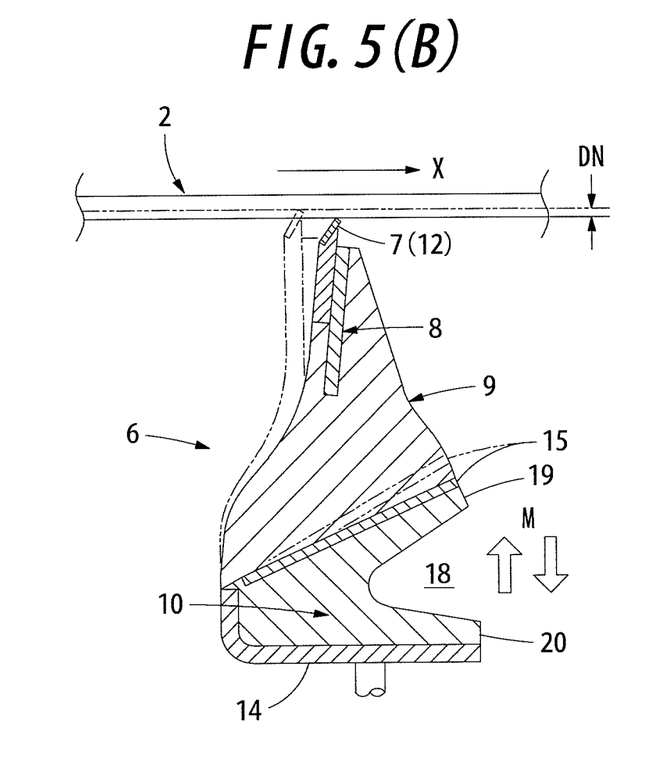

The operations of the cleaner unit 6 according to the invention are illustrated in FIG. 5 (A) and FIG. 5 (B). FIG. 5 (A) principally illustrates the operation of the upper resilient block 9. FIG. 5 (B) principally illustrates the operation of the lower resilient block 10.

In connection with the operation of the upper resilient block 9, FIG. 5 (A) shows the state where the leavings on the belt 2 are being scraped off by the scraping portion 7. The support plate 8 providing the scraping portion 7 shifts its posture from a forward leaning posture to an upright posture. The forward posture is shown by the chained lines which is an original posture at the time of installation. The upright posture is shown by solid lines which is a tilted posture about the hypothetical pivot axis 21 formed in the upper resilient block 9. Accordingly, the scraping portion 7 is raised as shown with a distance (UP) and pushed to the belt surface. As a result, the contact pressure of the scraping portion 7 to the belt surface increases so that the leavings are scraped off excellently.

In an assumption that if the upper resilient block 9 were formed of rubber having high modulus of rebound resilience like the conventional cleaner unit, a high rebound force, as shown by an arrow (R), is given to the scraping portion 7 to oppose the running direction of the belt 2. In this event, pulsing vibrations at the scraping portion 7 caused during the scraping operation cannot be absorbed. As a result, the support plate 8 vibrates violently as shown by arrows (S), and it becomes difficult to contact the scraping portion 7 with the surface of belt 2 in a stable manner.

In comparison with the above mentioned assumption case, according to the present invention, the upper resilient block 9 is formed of rubber having low modulus of rebound resilience (R1), such as butyl rubber. Accordingly, said high rebound force is not given to the scraping portion 7 so that pulsing vibrations at the scraping portion 7 may be absorbed, and generation of vibrations at the support plate 8 may be prevented. As a result, the scraping portion 7 becomes in contact with the surface of the belt 2 stably and scrape off the leavings excellently.

In addition, the retainer plate 11 of the scraping portion 7 keeps the upright posture together with the support plate 8 during the scraping operation. Accordingly, the leavings scraped off by the chip 12 may fall down suitably without heaping on the front side (F) of the cleaner unit 6.

In connection with the operation of the lower resilient block 10, FIG. 5 (B) shows with chained lines the state where the scraping portion 7 scrapes off the leavings on the belt surface in normal conditions. If the scraping portion 7 receives a further pushing force such as strong bumping force in the belt running direction (X) and/or in a downward direction, which may be caused due to bumping of hard material contained in the leavings against the scraping portion 7, the lower resilient block 10 is deformed from the normal configuration as shown by chained lines to the deformed configuration as shown by solid lines, and the scraping portion 7 together with the upper resilient block 9 moves to loose the bumping force as shown by solid lines. The scraping portion 7 retreats from the belt 2 as shown with a distance (DN), and absorbs or lessens bumping shocks. Immediately after such retreat, the scraping portion 7 is made to return its original position momentarily by restoration of the lower resilient block 10 with high modulus of rebound resilience, and the scraping portion 7 follows the running belt surface.

As far as the upper resilient block 9 is concerned, during the scraping operation where the support plate 8 is kept in the upright posture, the upper resilient block 9 is deformed and compressed. Therefore, when the scraping portion 7 receives bumping shocks as mentioned above, the upper resilient block 9 is difficult to be further deformed or compressed for absorbing and lessening such bumping shocks. Since the upper resilient block 9 is formed of rubber having low modulus of rebound resilience (R1), it is also difficult to be restored to return the scraping portion 7 to its original position momentarily, even if the upper resilient block 9 might be further deformed to retreat the scraping portion 7.

In this connection, according to the present invention, the upper resilient block 9 is supported resiliently at the bottom side thereof by the lower resilient block 10. The lower resilient block 10 is formed of rubber having high modulus of rebound resilience (R2), such as natural rubber or the like. Accordingly, the lower resilient block 10 can retreat the upper portion of the cleaner unit 6 including the upper resilient block 9, and the motions of retreating and momentary returning of the scraping portion 7 become possible. As a result, the capability of shock absorbing or lessening as well as the followability of the scraping portion 7 to the belt surface may be improved.

In the illustrated embodiment according to the present invention, the lower resilient block 10 is provided with the concave 18 in addition to its own resilient deformability. Therefore, the lower resilient block 10 having high modulus of rebound resilience makes the upper jaw 19 together with the rigid plate 15 move forward and backward towards the lower jaw 20 as shown by arrows (M). As a result, the excellent motions of retreating and returning momentarily after retreating of the scraping portion 7 become effective.

The invention claimed is:

1. A belt cleaner including one or more cleaner units mounted on a frame extending in a transverse direction of a conveyor belt, whereby leavings stuck on a belt surface are scraped off by a scraping portion provided at a top portion of said cleaner unit characterized in that:

said cleaner unit (6) comprises a support plate (8) providing said scraping portion (7), an upper resilient block (9) supporting resiliently a lower portion of said support plate, a lower resilient block (10) supporting resiliently a bottom of said upper resilient block (9), and a rigid plate (15) provided between said upper resilient block (9) and said lower resilient block (10), said rigid plate (15) being arranged along a sloping plane (HP) that rises in a direction (B) toward the rear of the cleaner unit and which follows a belt running direction, wherein said support plate (8) is supported by said upper resilient block (9) in such manner that said support plate (8) is held in a forward leaning posture along a tilted plane (VP) inclining towards a front direction (F) of the cleaner unit which opposes against a belt running direction (X) with respect to a vertical line (V) perpendicular to the belt surface, wherein said upper resilient block (9) includes hypothetical pivot axis (21) and is constituted to be deformed resiliently when a pushing force in said belt running direction is applied to said scraping portion so that said support plate (8) shifts its posture to an upright posture from said forward leaning posture about said hypothetical pivot axis (21) to lift up said scraping portion (7), and wherein said lower resilient block (10) is constituted to be deformed when a further pushing force in said belt running direction and/or in a downward direction is applied to said upper resilient block (9) which is compressed or deformed by said support plate (8) shifted to said upright posture so that said lower resilient block (10) allows said upper resilient block (9) to move downward in response to said further pushing force.

2. A belt cleaner according to claim 1, wherein said lower resilient block (10) is provided with a concave (18) extending laterally through a back side (B) thereof to form an upper jaw (19) and a lower jaw (20) so that said upper jaw (19) may move towards said lower jaw (20) by resilient deformation of the lower resilient block (10).

3. A belt cleaner according to claim 2, wherein said support plate (8) is held and substantially embedded in the upper resilient block (9) so that said upper resilient block (9) includes a resilient section (9a) in front side (F) and a resilient section (9b) in back side (B) at both sides of said support plate (8) respectively, and a thickness (T1) of said front section (9a) and a thickness (T2) of said back section (9b) are formed in condition of T1<T2.

4. A belt cleaner according to claim 3, wherein modulus of rebound resilience (R1) of said upper resilient block (9) and modulus of rebound resilient (R2) of said lower resilient block (10) are selected under condition of R1<R2, and thereby vibrations caused in said support plate (8) contacting with the belt surface may be absorbed by said upper resilient block (9) having said lower modulus of rebound resilience (R1).

5. A belt cleaner according to claim 4, wherein said upper resilient block (9) is formed of butyl rubber and said lower resilient block (10) is formed of natural rubber so that modulus of rebound resilience (R1) of said upper resilient block (9) and modulus of rebound resilient (R2) of said lower resilient block (10) are constituted in condition of R1<R2.

6. A belt cleaner according to claim 2, wherein modulus of rebound resilience (R1) of said upper resilient block (9) and modulus of rebound resilient (R2) of said lower resilient block (10) are selected under condition of R1<R2, and thereby vibrations caused in said support plate (8) contacting with the belt surface may be absorbed by said upper resilient block (9) having said lower modulus of rebound resilience (R1).

7. A belt cleaner according to claim 6, wherein said upper resilient block (9) is formed of butyl rubber and said lower resilient block (10) is formed of natural rubber so that modulus of rebound resilience (R1) of said upper resilient block (9) and modulus of rebound resilient (R2) of said lower resilient block (10) are constituted in condition of R1<R2.

8. A belt cleaner according to claim 1, wherein said support plate (8) is held and substantially embedded in the upper resilient block (9) so that said upper resilient block (9) includes a resilient section (9a) in front side (F) and a resilient section (9b) in back side (B) at both sides of said support plate (8) respectively, and a thickness (T1) of said front section (9a) and a thickness (T2) of said back section (9b) are formed in condition of T1<T2.

9. A belt cleaner according to claim 8, wherein modulus of rebound resilience (R1) of said upper resilient block (9) and modulus of rebound resilient (R2) of said lower resilient block (10) are selected under condition of R1<R2, and thereby vibrations caused in said support plate (8) contacting with the belt surface may be absorbed by said upper resilient block (9) having said lower modulus of rebound resilience (R1).

10. A belt cleaner according to claim 9, wherein said upper resilient block (9) is formed of butyl rubber and said lower resilient block (10) is formed of natural rubber so that modulus of rebound resilience (R1) of said upper resilient block (9) and modulus of rebound resilient (R2) of said lower resilient block (10) are constituted in condition of R1<R2.

11. A belt cleaner according to claim 1, wherein modulus of rebound resilience (R1) of said upper resilient block (9) and modulus of rebound resilient (R2) of said lower resilient block (10) are selected under condition of R1<R2, and thereby vibrations caused in said support plate (8) contacting with the belt surface may be absorbed by said upper resilient block (9) having said lower modulus of rebound resilience (R1).

12. A belt cleaner according to claim 11, wherein said upper resilient block (9) is formed of butyl rubber and said lower resilient block (10) is formed of natural rubber so that modulus of rebound resilience (R1) of said upper resilient block (9) and modulus of rebound resilient (R2) of said lower resilient block (10) are constituted in condition of R1<R2.

* * * * *